United States Patent [19]

Coleman et al.

[11] 4,145,962
[45] Mar. 27, 1979

[54] NUT CRACKER

[76] Inventors: Elmer Coleman, c/o George Spector, 3615 Woolworth Bldg., 233 Broadway; George Spector, 3615 Woolworth Bldg., 233 Broadway, both of New York, N.Y. 10007

[21] Appl. No.: 744,246

[22] Filed: Nov. 23, 1976

[51] Int. Cl.² .................... A23N 5/00; A47J 43/26
[52] U.S. Cl. ........................... 99/572; 99/579; 99/581
[58] Field of Search .................... 99/579, 572–573, 99/581–583; 30/120.2

[56] References Cited

U.S. PATENT DOCUMENTS 1,289,351  12/1918  Abt ........................................ 99/581

*Primary Examiner*—Harvey C. Hornsby
*Assistant Examiner*—Timothy F. Simone

[57] ABSTRACT

An implement for breaking open nuts by cracking instead of crushing them; the device including a concave stationary jaw, in which the nut is seated, and a concave slidable jaw for moving against an opposite side of the nut, the slidable jaw being supported on a screw-threaded shank that rotates in a stationary threaded opening so to advance the movable jaw a specific distance that is enough to crack open only the nut shell and not the nut meat.

1 Claim, 3 Drawing Figures

U.S. Patent      Mar. 27, 1979      4,145,962
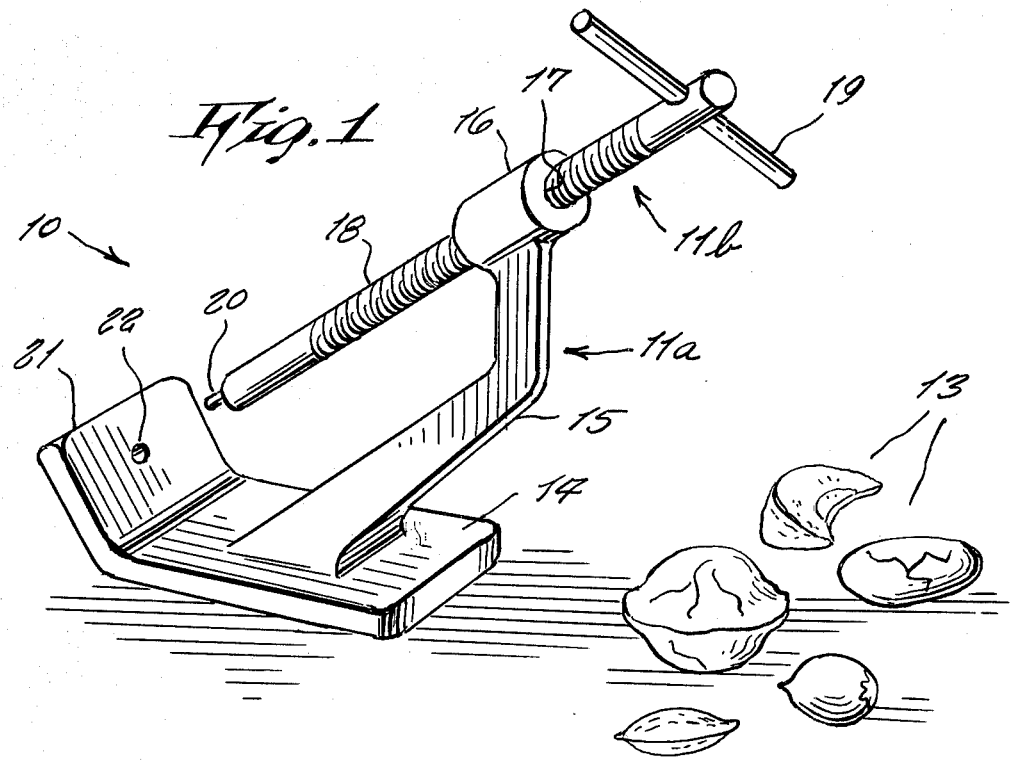
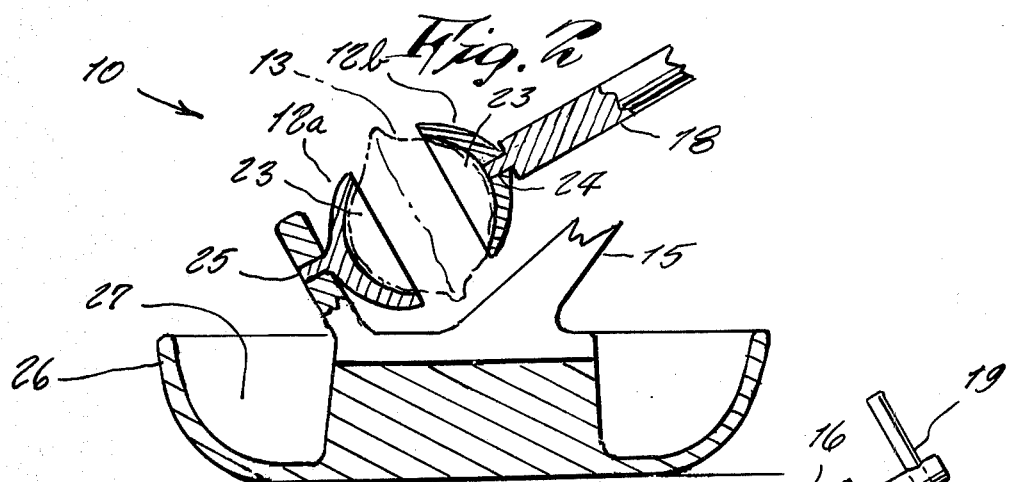
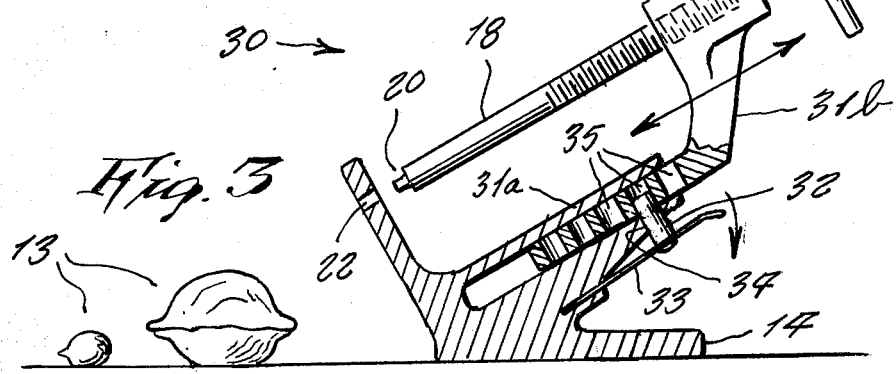

NUT CRACKER

This invention relates generally to nut crackers.

It is generally well known that a conventional nut cracker, consisting of two levers pivoted together to form jaws therebetween, very ofter completely crushes and crumbes a nut meat while attempting to crack open only the nut shell. This is due to the tool being squeezed in a hand and usually requires considerable pressure before the shell finally cracks open. It is not easy for a hand applying great squeezing pressure to instantly release presure, so that after breaking the shell, the pressure is often continued an instant longer resulting in crushing the nut meat into fragments. This is objectionable.

Accordingly, it is a principal object of the present invention to provide a nut cracker that applies no pressure after having broken through a nut shell so that the nut meat is not crushed or broken.

Another object is to provide a nut cracker having interchangable jaws to to fit different sizes of nuts.

Still another object is to provide a nut cracker which, although depending upon a slowly advancing screw to crack open a nut, can be quickly advanced so to change large distances between jaws between which a nut is held.

Other objects are to provide a nut cracker which is simple in design, inexpensive to manufacture, rugged in construction, easy to use and efficient in operation.

These and other objects will be readily evident upon a study of the following specification and the accompanying drawing wherein:

FIG. 1 is a perspective view of one design of the invention.

FIG. 2 is a side cross sectional view showing a modified design in which cups are fitted on the shaft prong and in the platform opening so to cradle a nut therebetween, and the device being incorporated together with a dish to hold nuts and nut shells.

FIG. 3 is a side cross sectional view of another modified design in which the screw shaft is quickly and easily adjustable so to fit larger or smaller nuts.

Referring now to the drawing in greater detail, and more particularly to FIGS. 1 and 2 thereof at this time, the reference numeral 10 represents a nut cracker according to the present invention wherein there is a stationary stand 11a that supports a slidable arbor 11b, the stand and the arbor each supporting a jaw 12a or 12b in which a nut 13 can be cracked open.

The stand includes a flat base 14 integral with an upwardly inclined leg 15 which at its upper end is integral with an inclined sleeve 16 having a threaded opening 17.

The arbor includes a screw-threaded shank 18 that engages the opening 17, one end of the shank having a cross pin handle 19 for applying leverage to rotate the threaded shank in the sleeve. An opposite end of the shank has a short projection 20 of narrow diameter integral therewith and on which one of the jaws 12b is removably mounted.

The base 14 includes an upwardly inclined toe portion 21 having an opening 22 in which the other jaw 12a is removably mounted. The projection 20 and opening 22 are aligned along a same axis.

Each jaw comprises a generally shallow, hemispherical member having a concave cavity 23 in which one side of a nut is seated. The jaw 12b has an opening 24 for engaging the projection 20 while the jaw 12a has a projection 25 for engaging the opening 22. Detents may be incorporated so to prevent the jaws to accidentally fall out, or else the projections and openings may be threaded for this purpose, as shown. The reason for the removability of the jaws is to that they may be changed with other pairs of jaws made in different sizes so to fit different sizes or shapes of nuts such as for example, a walnut, a filbert, a pecan, almond or Brazil nut, that last of which is odd-shaped, as shown in FIG. 1.

In operative use, a nut is seated between the jaws, as shown in FIG. 2, and the arbor is then turned so to advance the jaw 12a so to squeeze the nut until the shell cracks. When this occurs, the arbor by being threadedly supported on the stand, is not accidently thrust ahead and advanced to crush the nut meat, such as occurs with a common nut cracker, but remains stationary in this position. It is then unscrewed upwardly a short distance so to remove the nut which is then opened by removing the cracked shell and an unbroken nut meat is thus obtained.

In FIG. 2, the nut cracker 10 is mounted upon a center of a nut bowl 26 having circular depression 27 all around to hold nuts and nut shells.

In FIG. 3, a modified design of nut cracker 30 is the same as above described nut cracker 10, and like parts are identified with like reference numerals.

However, the nut cracker 30 includes a quick adjustment so to eliminate need to screw the arbor a long distance when changing between a large or small nut to be cracked. This is accomplished by the stand leg 15 being made in two parts 31a and 31b that are telescopically adjustable respective to each other, and are rigidly quickly and easily secured together at any selected position by means of a pin 32 on a leaf spring 33 being insertable through an opening 34 in leg part 31A and ay one of the openings 35 in leg part 31b, so that the jaw 12b, carried on the arbor, can be quicker slided a longer distance than would be possible by the screw thread alone. In this design the screw thread is used as a fine adjustment for accomplishing the nut squeezing operation described above.

Thus an improved nut cracker is presented.

While various changes may be made in the detail construction, it is understood that such changes will be within the spirit and scope of the present invention, as is defined by the appended claims.

What is claimed is:

1. A nut cracker comprising a stand having a base with a flat surface for resting on a flat support and a portion integral with said base extending upwardly and laterally away from said base at an angle greater than 90 degrees in combination with a leg mounted on said base and extending upward from said base, spaced from said portion, said leg including a threaded sleeve having an axis normal to said portion, further including a axially movable jaw having a shank threadedly mounted in said sleeve and having an operating handle said jaw being spaced from said base in further combination with an opposing fixed jaw on said portion aligned with said axis, further including a depression in said base beneath and encompassing said jaws for receiving cracked nut portions, said jaws being removable and replacable wherein said leg is adjustably mounted on said base including a projection parallel to said axis having a slot to receive said leg and aligned holes through said projection and leg adapted to receive a retaining pin to secure said leg at various positions relative to said projection and said portion.

* * * * *